April 30, 1940.					E. H. SHAFF					2,198,921
DUAL SPEED DRIVE
Filed Jan. 23, 1939					2 Sheets-Sheet 1
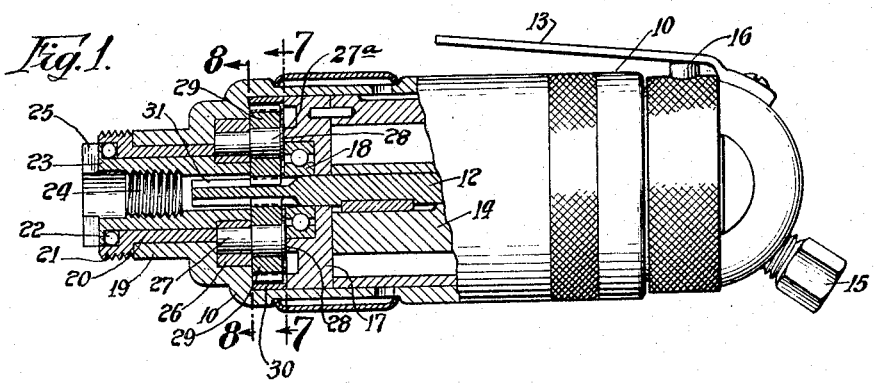
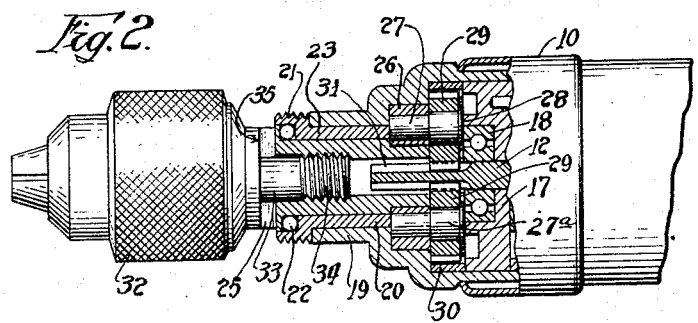
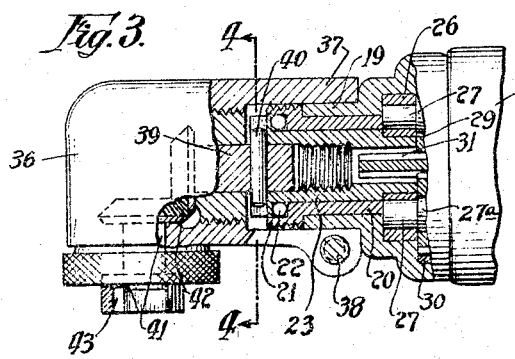 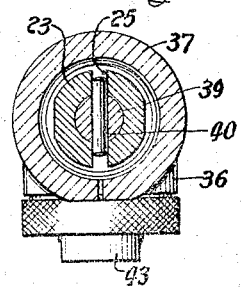
Inventor:
Ernest H. Shaff,
By:
Bair & Freeman
Attorneys

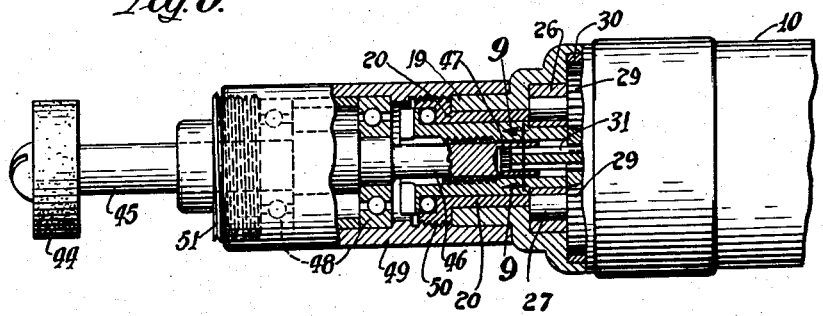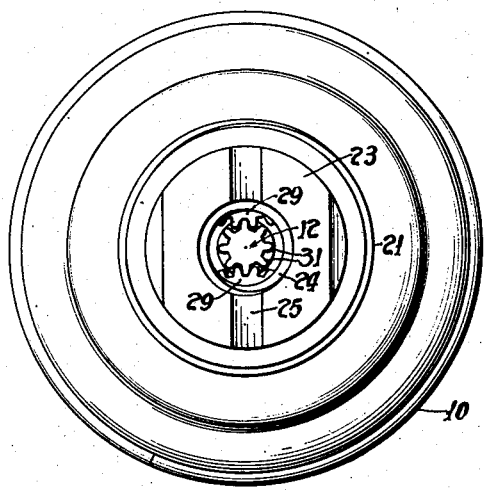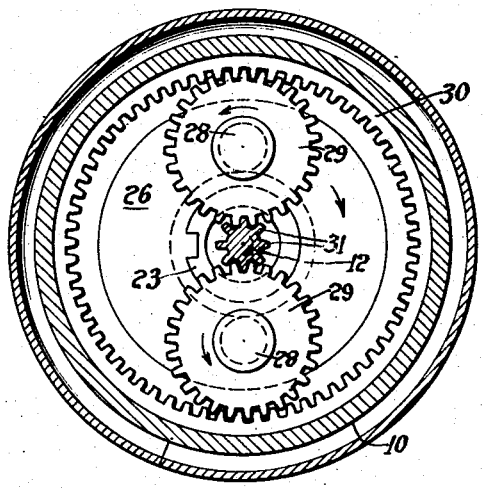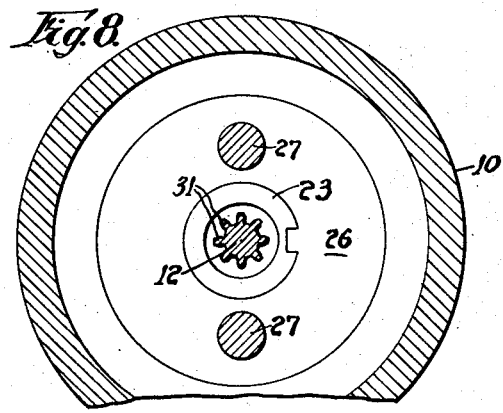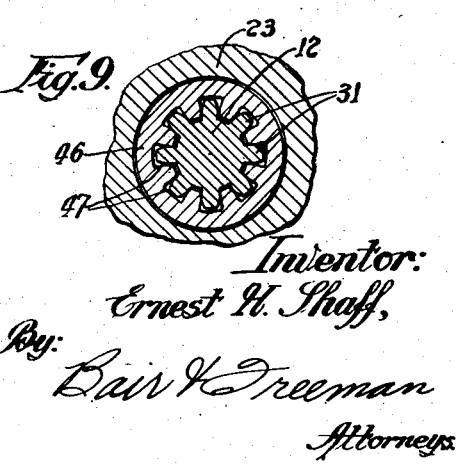

Patented Apr. 30, 1940

2,198,921

UNITED STATES PATENT OFFICE 2,198,921

DUAL SPEED DRIVE

Ernest H. Shaff, Bryan, Ohio, assignor to The Aro Equipment Corporation, Bryan, Ohio, a corporation of Ohio Application January 23, 1939, Serial No. 252,507

22 Claims. (Cl. 74—305)

An object of my invention is to provide a dual speed drive of simple and inexpensive construction particularly adaptable for small motors driven by air or electricity and operable for rotating drill chucks, grinders, wrenches and the like.

A further object is to provide a drive of this character in which one end of the motor housing is provided to receive attachments, some of which have parts to cooperate directly with the motor shaft and others of which have parts to cooperate with a sleeve surrounding the motor shaft, the sleeve being driven through step-down planetary gearing from the motor shaft and at a slower speed than the motor shaft.

Still another object is to provide the attachments with parts that properly coact with either the high speed motor shaft or the slow speed sleeve to be driven at the proper speed by one or the other of these elements.

A further object is to provide the housing of the motor with a stationary sleeve surrounding the rotating slow speed sleeve and adaptable to support any of the attachments designed for being driven by the motor through either the motor shaft or the slow speed sleeve.

Other objects, purposes and characteristic features of my invention will be partially obvious from the accompanying drawings and partially pointed out as the description of the invention proceeds. In describing the invention in detail, reference will be made to the accompanying drawings, in which like reference characters designate corresponding parts throughout the several views and in which Figure 1 is a side elevation partly in section showing my dual speed drive applied to an air motor, the drive being shown with all attachments removed;

Figure 2 is a similar sectional view of the drive showing a slow speed chuck attachment associated therewith;

Figure 3 is a similar view showing an angle head provided with a socket wrench for tightening nuts and the like;

Figure 4 is a sectional view on the line 4—4 of Figure 3 showing an operative connection between the angle head drive and the slow speed sleeve of the drive mechanism;

Figure 5 is a similar view showing a high speed spindle attachment including an emery wheel;

Figure 6 is an enlarged end elevation of the left end of Figure 1;

Figure 7 is an enlarged sectional view on the line 7—7 of Figure 1 showing the gear connections in my dual speed drive;

Figure 8 is a sectional view on the line 8—8 of Figure 1 showing supporting means for pinions of the planetary gearing mechanism, and Figure 9 is an enlarged sectional view on the line 9—9 of Figure 5 showing a high speed direct drive connection.

On the accompanying drawings I have used the reference numeral 10 to indicate a motor housing. The motor shaft therein is indicated at 12. By way of illustration I have shown an air motor including a rotor 14 on the shaft 12 and an air nipple 15 for supplying air to the motor. The air is controlled by a lever 13 operating an air valve 16.

Within the motor housing 10 is an end plate 17 for the rotor 14. It is provided with a ball bearing 18 for journaling the shaft 12.

The motor housing 10 has a reduced sleevelike portion 19 within which is pressed a stationary sleeve 20. The sleeve 20 is threaded at 21 and shouldered out to receive ball bearings 22.

Rotatable in the stationary sleeve 20 is a slow speed drive sleeve 23. It has internal threads 24 and a cross slot 25. The inner end of the drive sleeve 23 is shouldered down and has pressed thereon a washerlike flange 26. A pair of studs 27 are carried thereby and these studs are provided with enlarged heads 28. Between the heads 28 and the flange 26 are rotatably mounted pinions 29 on enlarged portions 27a of the studs 27.

Pressed in the housing 10 beyond the end plate 17 is an internal gear 30. The motor shaft 12 is provided with pinion teeth 31. From the construction of the parts just described and an inspection of Figure 7, it will be obvious that the motor shaft 12 and its gear teeth 31, upon rotation at high speed, will cause rotation of the pinions which will accordingly travel in a circular orbit inside the internal gear 30. In describing the orbit they will carry with them the studs 27 and consequently cause rotation of the flange 26 and drive sleeve 23 at a greatly reduced speed with relation to the speed of rotation of the shaft 12.

My dual speed drive as thus far described is adaptable for driving any number of suitable attachments. In Figure 2 I show a slow speed drill chuck 32. It has a shank 33 threaded as at 34. The threads 34 are adapted to coact with the internal threads 24 of the slow speed sleeve 23. A shoulder 35 of the chuck 32 engages against the outer end of the sleeve 23 when the chuck is screwed into the sleeve. Thereafter the chuck is rotated simultaneously with the sleeve.

In Figures 3 and 4 I show an angle head 36 having a split sleeve portion 37 to fit over the stationary sleevelike extension 19 of the motor housing 10. A clamp bolt 38 may then be tightened in the usual manner to clamp the split sleeve on the sleeve 19. The angle head 36 is thereby rigidly retained in position relative to the motor housing 10.

The angle head 36 includes a drive shaft 39 extending into the sleeve 23 and a cross pin 40 for coaction with the cross slot 25. A second shaft 41 is journaled in the angle head 36 at right angles to the drive shaft 39 and the two are operatively connected together by bevel gears 42. The shaft 41 terminates in a socket member 43 adapted to coact with a nut for tightening or loosening it, depending upon which way the motor shaft 12 is rotated.

In Figure 5 I show a high speed attachment including an emery wheel 44 and a spindle 45 therefor. The spindle 45 has a reduced portion 46 provided with broached grooves 47 in a socket at the end thereof. The socket is so shaped as to coact with the teeth 31 of the motor shaft 12 so that the motor shaft upon rotation will rotate the spindle 45.

The spindle 45 is journaled in ball bearings 48 which are supported by a sleeve 49. The sleeve 49 is provided with internal threads 50 to coact with the threads 21 of the stationary sleeve 20 and thereby retain the bearing support 49 in a rigidly assembled position on the motor housing 10. A plug 51 is mounted in the outer end of the sleeve 49 to retain the bearing assembly in position.

I have described the details of construction of my invention and it is believed that the operation thereof will be obvious from the foregoing description. Any one of the attachments shown in Figures 2, 3 and 5 can be readily removed from the housing 10 or replaced thereon at will. Although both the sleeve 23 and the motor shaft 12 rotate regardless of what attachment is placed in position, the attachment will cooperate with only the rotating element that has the proper speed of operation for that attachment. Any of the attachments may be removed or replaced in a minimum of time which of course is desirable from the standpoint of the workman using the tool.

Having described one specific embodiment of my invention together with the operation thereof, I desire it to be understood that this form is selected merely for the purpose of facilitating disclosure of the invention rather than for the purpose of limiting the number of forms which it may assume. It is to be further understood that various modifications, adaptations and alterations may be applied to the specific form disclosed to meet the requirements of practice without in any manner departing from the spirit and scope of the present invention except as set forth in the claims appended hereto.

I claim as my invention and desire to secure by Letters Patent of the United States:

1. In a structure of the character described, a motor housing, a motor shaft rotatable therein, a stationary sleeve extending from said motor housing, a rotatable sleeve journaled in said stationary sleeve, a plurality of studs carried by said rotatable sleeve, a pinion on each of said studs, said motor shaft having pinion teeth meshing with said pinions, a stationary internal gear in said motor housing, said pinions meshing therewith to cause rotation of said rotatable sleeve at a slower speed and in the same direction as said motor shaft upon rotation of the motor shaft, a plurality of tools adapted to be selectively supported, one of said tools having an operating element coacting with said rotatable sleeve and supported thereby for rotation thereby and another of said tools being supported on said stationary sleeve and having an operating element coacting with said motor shaft for rotation thereby.

2. In a structure of the character described, a motor housing, a motor shaft rotatable therein, a stationary sleeve extending from said motor housing, a rotatable sleeve journaled in said stationary sleeve, gear means for driving said rotatable sleeve from said motor shaft and reducing the speed thereof relative to the motor shaft, and a plurality of tools adapted to be selectively supported on said stationary sleeve, one of said tools having an operating element coacting with said rotatable sleeve for rotation thereby and another of said tools having an operating element coacting with said motor shaft for rotation thereby.

3. In a structure of the character described, a housing, a motor shaft rotatable therein, a rotatable sleeve journaled in said housing, the bore of said rotatable sleeve being threaded, a plurality of studs carried by said rotatable sleeve, a pinion on each of said studs, said motor shaft having pinion teeth meshing with said pinions, a stationary internal gear in said housing, said pinions meshing therewith to cause rotation of said rotatable sleeve at a slower speed and in the same direction as said motor shaft upon rotation of the motor shaft, a plurality of tools adapted to be selectively supported on said housing, one of said tools having a threaded operating element coacting with the threads of said rotatable sleeve for rotation thereby and another of said tools having an operating element coacting with said motor shaft pinion teeth for rotation thereby.

4. In a structure of the character described, a housing, a motor shaft rotatable therein, a rotatable sleeve journaled relative to said housing, a plurality of studs carried by said rotatable sleeve, a pinion on each of said studs, said motor shaft having pinion teeth meshing with said pinions, a stationary internal gear in said housing, said pinions meshing therewith to cause rotation of said rotatable sleeve at a slower speed and in the same direction as said motor shaft upon rotation of the motor shaft, a plurality of tools adapted to be selectively supported by said housing, one of said tools having an operating element coacting with said rotatable sleeve for rotation thereby and another thereof having an operating element extending rotatably through said rotatable sleeve and coacting with said motor shaft for rotation thereby.

5. In a dual speed structure of the character described, a housing, a motor shaft rotatable therein, a rotatable sleeve, operative means of connection between said motor shaft and said rotatable sleeve to cause rotation of said rotatable sleeve at a slower speed than said motor shaft upon rotation of the motor shaft, the bore of said rotatable sleeve being threaded, a plurality of tools adapted to be selectively supported, one of said tools having a threaded operating element coacting with the threaded bore of said rotatable sleeve for rotation thereby and another thereof having an operating element extending completely through said rotatable sleeve and coacting with said motor shaft for rotation thereby.

6. In a structure of the character described, a motor housing having a stationary sleeve, a motor shaft rotatable therein, a rotatable sleeve journaled in said stationary sleeve, an operative connection between said rotatable sleeve and said motor shaft, said rotatable sleeve having a slot in the end thereof, a plurality of tools adapted to be selectively supported on said stationary sleeve, one of said tools having an operating element coacting with the slot in said rotatable sleeve for rotation thereby and another thereof having an operating element extending through said rotatable sleeve, rotatable relative thereto and coacting with said motor shaft for rotation thereby.

7. In a structure of the character described, a rotatable motor shaft, a rotatable sleeve, the bore of said rotatable sleeve being threaded and having a slot in the end thereof, an operative connection between said rotatable sleeve and said motor shaft to cause rotation of said rotatable sleeve at a slower speed than said motor shaft upon rotation of the motor shaft, a plurality of tools adapted for operation by said motor, one of said tools having means for coaction with said slot in the end of said rotatable sleeve and another thereof being supported by said rotatable sleeve and having a threaded operating element coacting with the threads thereof.

8. In a structure of the character described, a motor housing, a motor shaft rotatable therein, a stationary sleeve extending from said motor housing, a rotatable sleeve journaled in said stationary sleeve, the bore of said rotatable sleeve being threaded and having a slot in the end thereof, a plurality of studs carried by said rotatable sleeve, a pinion on each of said studs, said motor shaft having pinion teeth meshing with said pinions, a stationary internal gear in said motor housing, said pinions meshing therewith to cause rotation of said rotatable sleeve at a slower speed and in the same direction as said motor shaft upon rotation of the motor shaft, a plurality of tools adapted for operation by said motor, one of said tools being supported on said stationary sleeve and having means for coaction with said slot in the end of said rotatable sleeve, another of said tools being supported on said stationary sleeve and having a threaded operating element coacting with the threads of said sleeve and still another of said tools being supported by said rotatable sleeve and having a threaded operating element coacting with the threads thereof.

9. In a structure of the character described, a motor housing, a motor shaft rotatable therein, a stationary sleeve, said sleeve being threaded, a rotatable sleeve journaled in said stationary sleeve and having a slot in the end thereof, a plurality of studs carried by said rotatable sleeve, a pinion on each of said studs, said motor shaft having pinion teeth meshing with said pinions, a stationary internal gear in said motor housing, said pinions meshing therewith to cause rotation of said rotatable sleeve at a slower speed than said motor shaft upon rotation of the motor shaft, a plurality of tools adapted for operation by said motor, one of said tools being supported on said stationary sleeve and having means of coaction with said slot in the end of said rotatable sleeve, another being supported by said rotatable sleeve and having an operating element coacting therewith, and another of said tools having threaded means to coact with the threads of said stationary sleeve to retain the tool supported thereon and having an operating element coacting with said motor shaft for rotation thereby.

10. In a structure of the character described, a motor housing, a motor shaft rotatable therein, a stationary sleeve extending from said motor housing, said sleeve being threaded, a rotatable sleeve journaled in said stationary sleeve and having a threaded bore, an operative connection between said rotatable sleeve and said motor shaft to cause rotation of said rotatable sleeve at a slower speed than said motor shaft upon rotation of the motor shaft, a plurality of tools adapted for operation by said motor, one of said tools being supported on said stationary sleeve and having means for operative coaction with said rotatable sleeve, another being supported by said rotatable sleeve and having a threaded operating element coacting with the threads thereof and another being supported on said stationary sleeve and having threaded means to coact with the threads thereof to retain the tool supported thereon and having an operating element coacting with said motor shaft for rotation thereby.

11. In a dual speed drive of the character disclosed, a motor housing, a motor shaft rotatable therein and having an other than round driving portion, pinion teeth carried by said motor shaft, planetary pinions meshing therewith, an internal gear adjacent the outer wall of said motor housing, said planetary pinions meshing therewith, studs on which said planetary pinions are rotatable, a rotatable sleeve journaled in said motor housing and carrying said studs, said rotatable sleeve having means of operative coaction with parts of tools to be driven thereby, and a stationary sleeve surrounding said rotatable sleeve, said stationary sleeve having a screw-threaded portion with which a corresponding part of a tool may be engaged for connecting and supporting the tool relative to the stationary sleeve, said last tool having an other-than-round driven portion for operative coaction with said other-than-round driving portion of said motor shaft when said corresponding part of the tool is engaged with said screw-threaded portion of said stationary sleeve.

12. In a dual speed drive of the character disclosed, a motor housing, a motor shaft rotatable therein and having an other than round driving portion for coaction with corresponding parts of tools to be driven thereby, pinion teeth carried by said motor shaft, planetary pinions meshing therewith, an internal gear stationary relative to said motor housing, said planetary pinions meshing therewith, studs on which said planetary pinions are rotatable, a rotatable sleeve carrying said studs, a stationary sleeve surrounding said rotatable sleeve, said rotatable sleeve having a slotted end for coaction with a corresponding part of a tool to be driven thereby and said tool having a supporting sleeve coacting with said stationary sleeve for support thereby.

13. In a dual speed drive of the character disclosed, a motor housing, a motor shaft rotatable therein, pinion teeth carried by said motor shaft, planetary pinions meshing therewith, an internal gear stationary relative to said motor housing, said planetary pinions meshing therewith, studs on which said planetary pinions are rotatable, a rotatable sleeve carrying said studs, a stationary sleeve in which said rotatable sleeve is journalled, said rotatable sleeve having a slotted end for coaction with a corresponding part of a tool to be driven thereby, said stationary sleeve having threads and said last mentioned tool having a threaded portion to coact with said threads for supporting the tool with relation to the stationary sleeve.

14. In a dual speed drive of the character disclosed, a motor housing, a motor shaft rotatable therein and having a driving portion for coaction with a tool to be driven thereby, a rotatable sleeve journaled in said motor housing and operatively connected with said motor shaft, said rotatable sleeve having a threaded bore and a slotted end for coaction with corresponding parts of tools to be driven thereby.

15. In a dual speed drive of the character disclosed, a motor housing, a motor shaft rotatable therein and having a driving portion for coaction with a corresponding part of a tool to be driven thereby, a stationary sleeve provided with threads, a rotatable sleeve journalled in said stationary sleeve, said rotatable sleeve having a driving portion for coaction with a corresponding part of a tool to be driven thereby, and a geared down operative connection between said rotatable sleeve and said motor shaft.

16. In a structure of the character described, a rotatable motor shaft, a rotatable sleeve operatively connected therewith to cause rotation of said rotatable sleeve at a slower speed than said motor shaft upon rotation of the motor shaft, a plurality of tools adapted to be selectively connected with said rotatable sleeve and motor, one of said tools having an operating element coacting with said rotatable sleeve for rotation thereby and another having an operating element extending through and rotatable in said rotatable sleeve, said last operating element coacting with said motor shaft for rotation thereby.

17. In a structure of the character described, a housing, a motor shaft rotatable therein, a rotatable sleeve journaled in said housing, a plurality of studs carried by said rotatable sleeve, a pinion on each of said studs, said motor shaft having pinion teeth meshing with said pinions, a stationary internal gear in said housing, said pinions meshing therewith to cause rotation of said rotatable sleeve at a slower speed and in the same direction as said motor shaft upon rotation thereof, a plurality of tools adapted to be selectively supported on said housing, one of said tools having an operating element coacting with said sleeve for rotation thereby, and another of said tools having an operating element coacting with said motor shaft pinion teeth for rotation thereby.

18. In a structure of the character described, a housing, a motor shaft rotatable therein, a threaded rotatable sleeve journaled in said housing, a plurality of studs carried by said rotatable sleeve, a pinion on each of said studs, said motor shaft being operatively connected with said pinions, a stationary internal gear in said housing, said pinions meshing therewith to cause rotation of said rotatable sleeve at a slower speed than said motor shaft upon rotation thereof, a plurality of tools adapted to be selectively supported on said housing, one of said tools having a threaded operating element coacting with the threads of said rotatable sleeve for rotation thereby, and another of said tools having an operating element coacting with said motor shaft for rotation thereby.

19. In a structure of the character described, a rotatable motor shaft, a rotatable sleeve, the bore thereof being threaded, an operative connection between the rotatable sleeve and said motor shaft to cause rotation of said rotatable sleeve at a slower speed than said motor shaft upon rotation thereof, a plurality of tools adapted for operation by said motor, one of said tools having means for coaction with said rotatable sleeve and another thereof being supported by said rotatable sleeve and having a threaded operating element coacting with the threads thereof.

20. In a structure of the character described, a rotatable motor shaft, a rotatable sleeve having a slot in the end thereof, an operative connection between said rotatable sleeve and said motor shaft to cause rotation of the sleeve at a slower speed than the motor shaft upon its rotation, a plurality of tools adapted for rotation by said motor, one of said tools having means for coaction with said slot in the end of said rotatable sleeve and another thereof being supported by said rotatable sleeve and having an operating element operatively coacting with said rotatable sleeve.

21. In a structure of the character described, a motor housing a motor shaft therein, a stationary sleeve extending from said motor housing, a rotatable sleeve journaled in said stationary sleeve, an operative connection between said rotating sleeve and said motor shaft to cause rotation of said rotatable sleeve at a slower speed than said motor shaft upon its rotation, a plurality of tools adapted for operation by said motor, one of said tools being supported on said stationary sleeve and having means for operative coaction with said rotatable sleeve, another of said tools being supported by said rotatable sleeve and having means for operative connection therewith, and another of said tools being supported on said stationary sleeve, having means for operatively coacting therewith to retain the tool supported thereon and having an operating element coacting with said motor shaft for rotation thereby.

22. In a dual speed drive of the character disclosed, a motor housing, a motor shaft rotatable therein, said motor shaft having an other than round driving portion and pinion teeth, planetary pinions meshing with said pinion teeth, an internal gear stationary relative to said motor housing, said planetary pinions meshing therewith, studs on which said planetary pinions are rotatable, a rotatable sleeve carrying said studs, a stationary sleeve in which said rotatable sleeve is journaled, said rotatable sleeve having a slotted end for coaction with the corresponding part of a tool to be driven thereby, said tool being supported by coaction with said stationary sleeve, and another tool having a driven portion coactable with said other than round portion of said motor shaft, said last tool having a threaded portion to coact with said threads of said stationary sleeve for supporting the tool with relation thereto.

ERNEST H. SHAFF.